United States Patent [19]

Pohjalainen et al.

[11] Patent Number: 5,734,249
[45] Date of Patent: Mar. 31, 1998

[54] METHOD AND APPARATUS FOR DIRECT TORQUE CONTROL OF A THREE-PHASE MACHINE

[75] Inventors: Pasi Pohjalainen, Nussbaumen; Christian Stulz, Zürich, both of Switzerland

[73] Assignee: Asea Brown Boveri AG, Baden, Switzerland

[21] Appl. No.: 812,314

[22] Filed: Mar. 5, 1997

[30] Foreign Application Priority Data

Apr. 1, 1996 [DE] Germany ............ 196 12 920.6

[51] Int. Cl.$^6$ ............................ H02P 5/40
[52] U.S. Cl. ............ 318/798; 318/803; 318/808; 318/811
[58] Field of Search ............ 318/789–823; 363/156–163

[56] References Cited

U.S. PATENT DOCUMENTS

| | | | |
|---|---|---|---|
| 4,314,190 | 2/1982 | Walker et al. | 318/798 |
| 4,388,577 | 6/1983 | Blaschke et al. | 318/717 |
| 4,484,128 | 11/1984 | Jotten et al. | 318/805 |
| 4,677,360 | 6/1987 | Garces | 318/803 |
| 4,724,373 | 2/1988 | Lipo | 318/805 |
| 4,780,650 | 10/1988 | Miyazaki et al. | 318/71 |
| 4,792,741 | 12/1988 | Matsuo et al. | 318/800 |
| 4,885,520 | 12/1989 | Sugimoto et al. | 318/808 |
| 5,166,593 | 11/1992 | De Doncker et al. | 318/800 |
| 5,212,438 | 5/1993 | Miyazaki et al. | 318/805 |
| 5,272,429 | 12/1993 | Lipo et al. | 319/908 |
| 5,334,923 | 8/1994 | Lorenz et al. | 318/805 |
| 5,365,158 | 11/1994 | Tanaka et al. | 318/806 |

FOREIGN PATENT DOCUMENTS

| | | |
|---|---|---|
| 0179356B1 | 4/1986 | European Pat. Off. . |
| 0595319A2 | 5/1994 | European Pat. Off. . |

OTHER PUBLICATIONS

"Direkte Drehmomentregelung von Drehstromantrieben", Aaltonen, et al., ABB Technik, Mar. 1995, pp. 19–24.

"Feldorientiert geregelter Ummrichterantrieb mit sinusformigen Maschinenspannungen", Zimmermann, etzArchiv Bd., Oct. 1988, pp. 259–265.

*Primary Examiner*—Paul Ip
*Attorney, Agent, or Firm*—Burns, Doane, Swecker & Mathis, L.L.P.

[57] ABSTRACT

A method and an apparatus for direct torque control are specified for a three-phase machine fed via a harmonic filter, which method manages as far as possible without any major adaptation to already known DTC methods and DTC apparatuses. In addition, the oscillations caused by the filter are intended to be damped effectively. This is achieved in that a current flowing through the filter and/or a filter output voltage are/is measured, and the reference flux value and the reference torque value are corrected on the basis of the measured voltage and/or of the measured current. The correction comprises a transformation of the filter output voltage into a first component at right angles to a stator flux and into a second component parallel to the stator flux, as well as a reduction in the reference torque and flux values in proportion to the oscillating part of the filter output voltage.

10 Claims, 4 Drawing Sheets

METHOD AND APPARATUS FOR DIRECT TORQUE CONTROL OF A THREE-PHASE MACHINE

BACKGROUND OF THE INVENTION

1. Field of the Invention

The invention relates to the field of power electronics. It is based on a method for Direct Torque Control (=DTC) according to the descriptive part of the first claim.

2. Discussion of Background

Such a method and a corresponding apparatus are described in the article "Direkte Drehmomentregelung yon Drehstromantrieben" [Direct torque control of three-phase drives], ABB Technik 3/1995, pages 19–24. This method is based on so-called "direct self-control", as is described in EP-B1-0 179 356. The DTC method represents a simple, reliable and highly dynamic torque control method for three-phase machines. In principle, it comprises the following steps:

- Calculation of an actual flux value from a converter voltage
- Calculation of an actual torque value
- Comparison of the actual flux value and the actual torque value with corresponding reference values by means of a hysteresis controller
- Formation of an optimum control vector for the switches in the converter on the basis of the hysteresis controller.

In order to protect the machine against excessively steep voltage flanks, which may lead to damage to the insulations, it is desirable to connect a harmonic filter between the converter and the motor. A control method is specified, for example, in EP-A2-0 595 319 for a system of pulse-duration-modulated converters with a harmonic filter. The filter capacitance and the filter inductance represent two integrators in control engineering terms. There is thus a 180° phase shift between the motor voltage and the converter voltage at the switching frequency, in the frequency band. This means that the signals required for the DTC method are present with an incorrect mathematical sign. Because of the 180° phase shift, caused by the harmonic filter, between the motor voltage and the converter voltage, the known DTC method can no longer be applied directly to an arrangement with a harmonic filter. In addition, disturbing oscillations occur because of the filter resonance.

SUMMARY OF THE INVENTION

Accordingly, one object of the invention is to provide a novel method and apparatus for direct torque control for a three-phase machine fed via a harmonic filter, which method manages as far as possible without major adaptation to already known methods and apparatuses. In addition, the oscillations caused by the filter are intended to be damped effectively.

This object is achieved by the features of the first claim for a method of the type mentioned initially.

The essence of the invention is thus that a current flowing through the filter and/or a filter output voltage are/is measured, and the reference flux value and the reference torque value are corrected on the basis of the measured voltage and/or of the measured current.

The correction comprises a transformation of the filter output voltage into a first component at right angles to a stator flux and into a second component parallel to the stator flux as well as a reduction in the reference torque and flux values in proportion to the oscillating part of the filter output voltage.

The oscillations caused by the harmonic filter can be effectively damped in this way.

The components can be calculated in various ways. Instead of a filter output voltage, a filter current can also be measured, and a filter voltage can be calculated from this. These variants are the subject matter of dependent claims. In addition, an apparatus for carrying out a method according to the invention is also specified.

Other exemplary embodiments result from the corresponding dependent claims.

The advantage of the design according to the invention is that the three-phase machine can be protected by the use of a harmonic filter against excessively steep voltage flanks which can lead to damage to the insulation, and, nevertheless, that essential parts of the DTC method and of a corresponding apparatus can be used without any major change.

In addition, oscillations caused by the filter can be damped effectively.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

Figure 1:
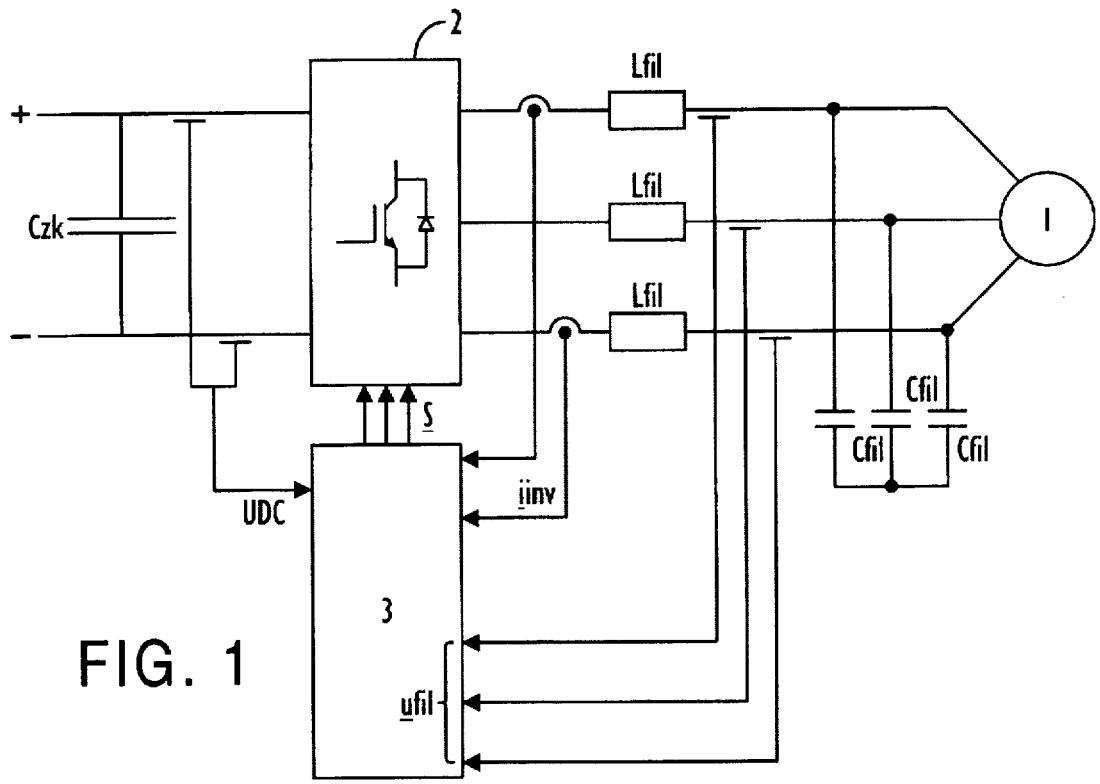
FIG. 1 shows a circuit arrangement with a three-phase machine fed from a converter via a harmonic filter.

The designations used in the drawings and their meanings are listed in summary form in the List of Designations.

DESCRIPTION OF THE PREFERRED EMBODIMENTS

Referring now to the drawings, wherein like reference numerals designate identical or corresponding parts through the several views used, FIG. 1 shows a circuit arrangement with a three-phase machine 1 which is fed from a converter 2 via a harmonic filter comprising a three-phase network with filter inductances $L_{fil}$ and filter capacitances $C_{fil}$. The capacitances of the filter are combined to form a star point, which is not connected to the intermediate circuit. The intermediate circuit is represented by the intermediate-circuit capacitor $C_{zk}$. A DC voltage $U_{DC}$ is applied to the intermediate-circuit capacitor. A torque controller 3 is provided for torque control of the motor 1. This is fed, according to FIG. 1, from the intermediate-circuit voltage $U_{DC}$, from a current $i_{inv}$ emitted by the converter, and from a filter output voltage $u_{fil}$. In the variant according to FIG. 2, a filter current $i_{fil}$ may also be measured instead of the filter output voltage $u_{fil}$. The converter 2 may be either a two-point invertor or a three-point invertor.

Underlined variables in each case designate vectors in the following text. These may be transformed into vectors from the measured conductor currents or conductor voltages in the phases, using the known 120°/90° transformation.

The torque controller 3 uses the measured variables as well as a reference flux value $\psi_{ref}$ and a reference torque value $T_{ref}$ to calculate an optimum control vector S ($S_A$, $S_B$, $S_C$) which is used for driving the switches in the converter 2.

FIGS. 3–7 show block diagrams of various variants of torque controllers 3. That part of the regulator which is above the dashed line corresponds to the already known DTC controllers. The lower part comprises the adaptations according to the invention.

In the following text, the fundamental principle of DTC control will be discussed briefly once again, and the problems on which the invention is based will be explained:

In the DTC method, an actual flux value $\psi_{act}$ is calculated from a converter output voltage $u_{inv}$ and a correction variable. The correction variable corresponds, to a first approximation, to the voltage drop $R_s \cdot i_s$ across the copper resistance of the stator. The calculation is much more accurate if a motor model is used as an aid. However, this is not important to the invention, so that further reference at this point will be to the said voltage drop.

The actual flux value is thus given by: $\psi_{act} = \int(u_{inv} - R_s i_s)dt$. The converter output voltage $u_{inv}$ is in this case formed with the aid of a voltage forming element 8 from the intermediate-circuit voltage $U_{DC}$ and the actual control vector S. An actual torque value $T_{act}$ is subsequently formed from the calculated actual flux value $\psi_{act}$ and a current $i_{inv}$ emitted by the converter. The current $i_{inv}$ is obtained by measuring two phase currents and by transformation into a vector. The actual torque value $T_{act}$ is obtained, finally, by forming the vector product of the current $i_{inv}$ and of the flux $\psi_{act}$. In addition, the magnitude $\psi_{act}$ of the actual flux value $\psi_{act}$ is also formed. $T_{act}$ and $\psi_{act}$ are subsequently compared, by means of a hysteresis controller 4, with corresponding externally predetermined reference values $\psi_{ref}$ and $T_{ref}$. The result of this comparison and the result of a vector assigner 12, which uses the actual flux value $\psi_{act}$ to determine an actual flux .vector, are supplied to a logic circuit 13 which determines an optimum control vector S ($S_A$, $S_B$, $S_C$) for the converter.

However, if a harmonic filter is now connected between the converter and the motor as in the case of the invention, then, on the one hand, there is a 180° phase shift in the current and voltage at the switching frequency because of the double integration of the filter, so that the DTC method can no longer be applied directly. On the other hand, the filter causes resonant oscillations, which are intended to be damped. The known method and the known apparatus must therefore be adapted, as is described in the following text.

The adaptation essentially comprises a current flowing through the filter and/or a filter output voltage being measured, and the reference flux value, or its magnitude, and the reference torque value being corrected on the basis of the measured filter variables. In particular, they are reduced in proportion to an oscillating part of the filter output voltage. There are various variants for calculating these oscillating disturbance variables:

A first exemplary embodiment (FIG. 3) comprises measurement of the filter output voltage on each phase and conversion, for example by means of 120°/90° transformation, into a vector $u_{fl}$. In addition, the product $i_{inv} L_{fl}$ is subtracted from the actual flux value $\psi_{act}$. A multiplier 5 and a subtractor 7 are provided for this purpose. In this way, a variable $\psi_s$ is obtained, which corresponds to a stator flux. The voltage $u_{fl}$ is now split into a component $u_{fld}$ parallel to $\psi_s$ and into a component $u_{flq}$ at right angles to $\psi_s$. A vector product forming element 9 and a scalar product forming element 10 are provided for this purpose, which multiply the voltage $u_{fl}$ by $\psi_s$. The component $u_{flq}$ is produced from the vector product, and the component $u_{fld}$ from the scalar product. $u_{fld}$ represents just that proportion of the filter output voltage causing the oscillations and is therefore multiplied in a further multiplier 5 by the constant $K_1$, is supplied to a limiter 6 and is subtracted from the reference flux value $\psi_{ref}$ in a subtractor 7. The oscillating part of $u_{flq}$ must also be formed, in contrast. This is done according to FIG. 3 by subtracting a constant value $\varnothing \cdot \psi_s$ from $u_{flq}$. $\bar{\omega}$ in this case corresponds to the angular frequency of the stator flux. In the steady state, $u_{flq}$ should correspond precisely to this value, so that the difference $u_{flq} = \bar{\omega} \cdot \psi_s$ thus corresponds just to the oscillating part $\Delta u_{flq}$ of $u_{flq}$. This value is likewise multiplied in a multiplier 5 by a second constant $K_2$, and is supplied to a limiter 6. Finally, the reference torque value is reduced by means of a further subtractor 7, using the output of this limiter 6.

The essence of the method and of the apparatus according to the invention is thus based on the fact that the influence of the harmonic filter is included in the control system, in that those elements of the filter output voltage which cause the oscillations are first of all damped and a virtual converter flux and a converter moment, so to speak, are controlled as actual variables instead of directly controlling variables which correspond to the motor flux or motor moment upstream of the filter.

A second exemplary embodiment (FIG. 4) differs from the first in that the oscillating parts of the components $u_{fld}$ and $u_{flq}$ are obtained by means of high-pass filtering. Two high-pass filters are provided for this purpose and are connected upstream of the multipliers 5, after the vector and scalar product formation 9, 10.

Figure 5:
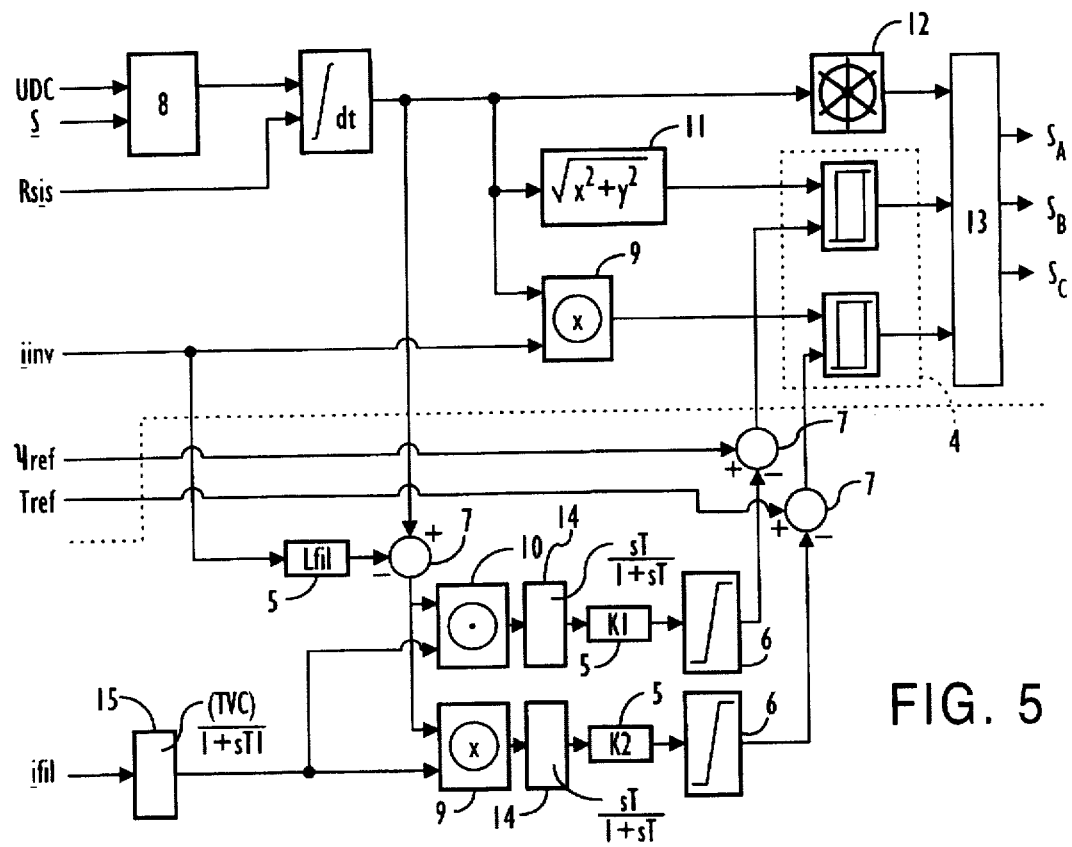
FIG. 5 shows a block diagram of an apparatus according to the invention, based on a third exemplary embodiment.
Figure 6:
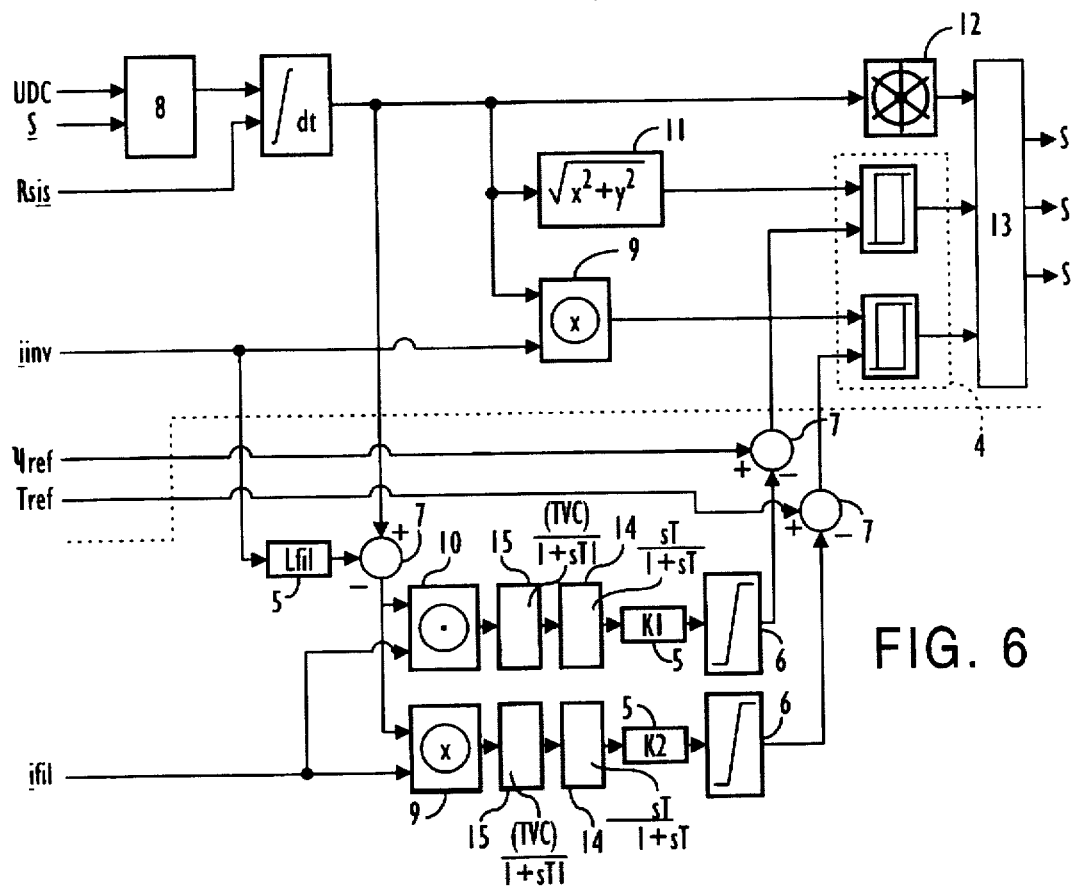
FIG. 6 shows a block diagram of an apparatus according to the invention, based on a fourth exemplary embodiment.

In the case of a third exemplary embodiment (FIG. 5), a filter current $i_{fl}$ is measured instead of a filter output voltage $u_{fl}$. FIG. 5 is thus based on FIG. 2. $i_{fl}$ is obtained, for example, by measuring two currents flowing through the filter capacitors $C_{fl}$, and by converting these currents into a vector. Two currents are sufficient, since the sum of all the currents must be zero because of the star connection of the capacitors. The voltage $u_{fl}$ across the capacitor can be calculated from the current $i_{fl}$ by means of limited integration. A limited integrator 15 is provided for this reason in FIG. 5 at the input of $i_{fl}$. Otherwise, the arrangement in FIG. 5 corresponds to that in FIG. 4.

Figure 3:
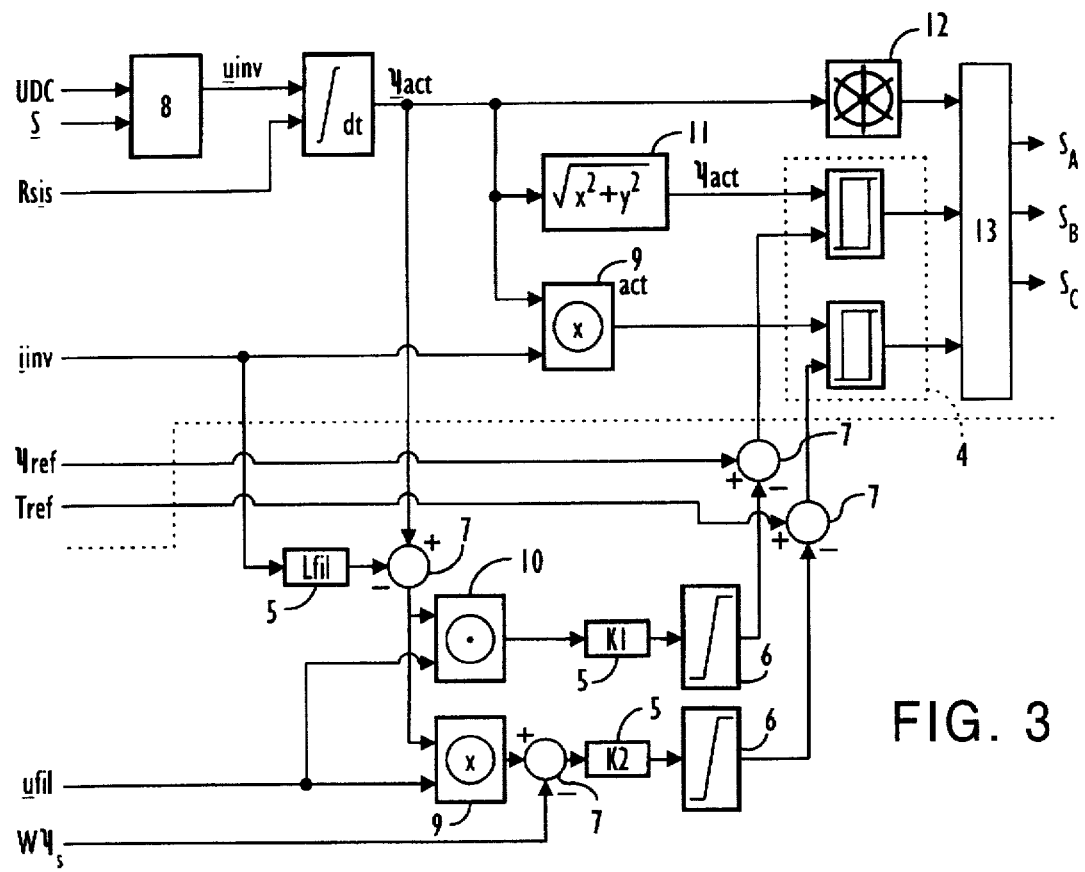
FIG. 3 shows a block diagram of an apparatus according to the invent ion, based on a first exemplary embodiment.
Figure 4:
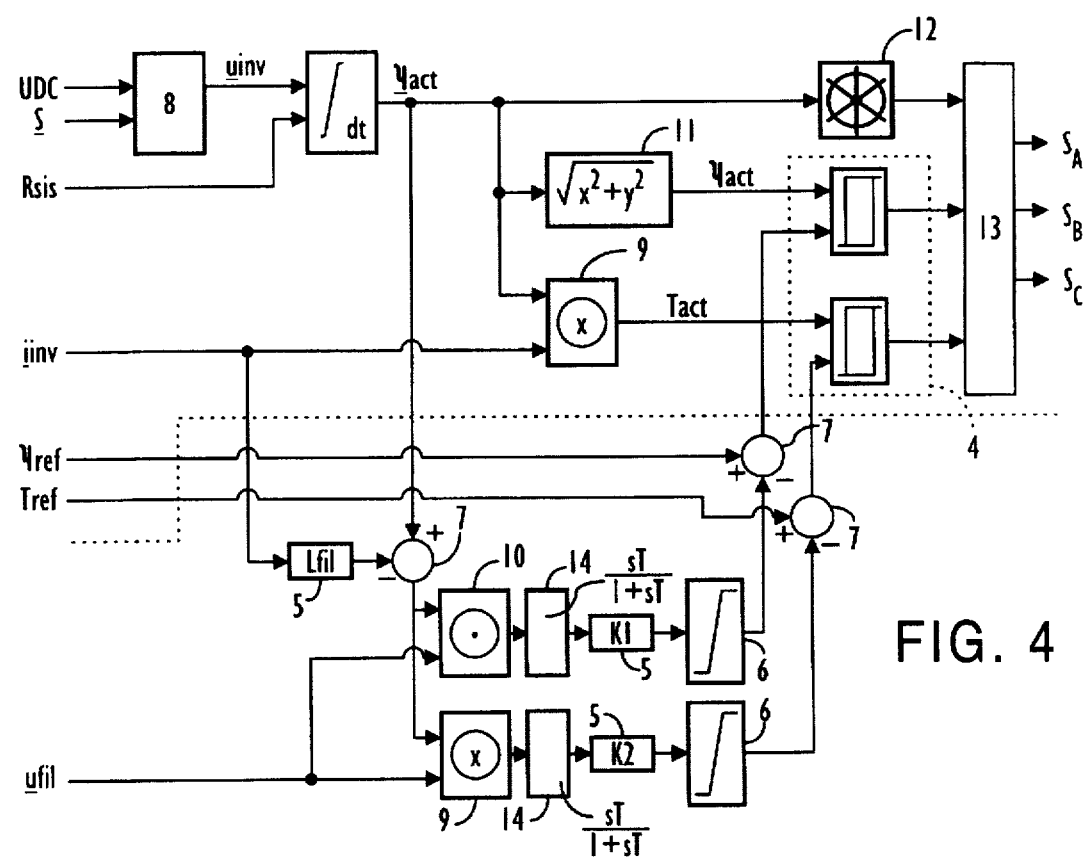
FIG. 4 shows a block diagram of an apparatus according to the invention, based on a second exemplary embodiment.

The variant according to FIG. 3 can, of course, also be applied to the third exemplary embodiment. According to a fourth exemplary embodiment (FIG. 6), the integration can also be carried out after the scalar and vector product formation.

Figure 2:
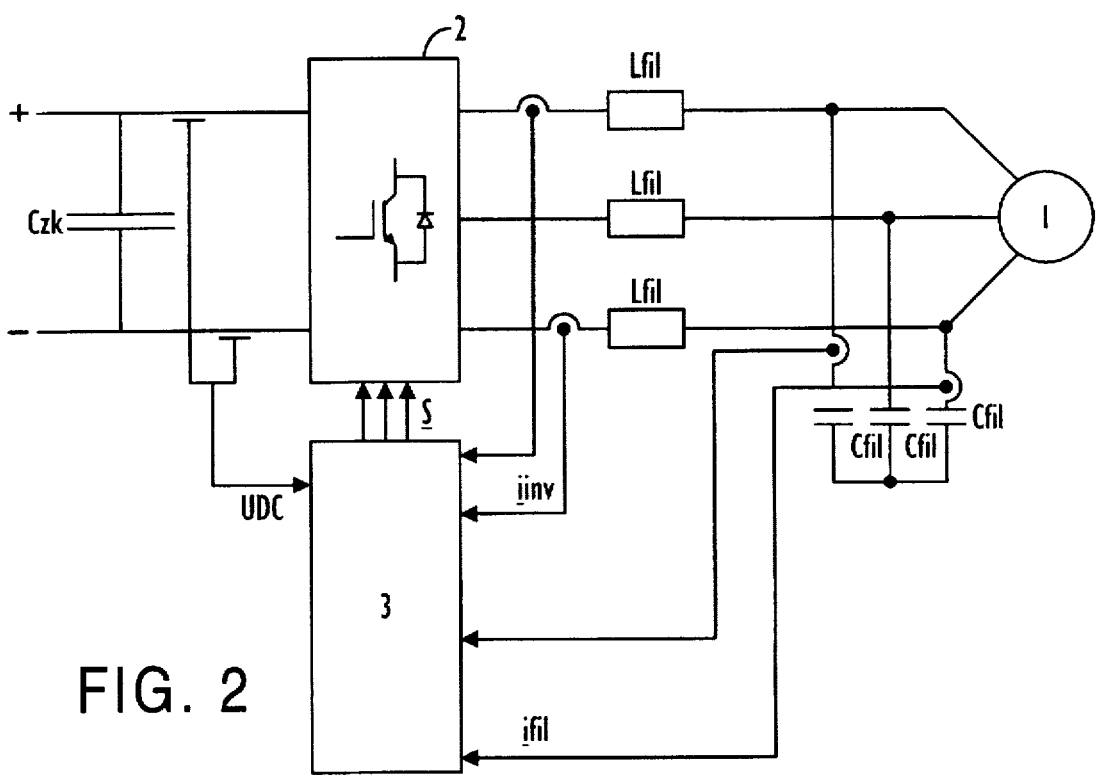
FIG. 2 shows a variant of FIG. 1.
Figure 7:
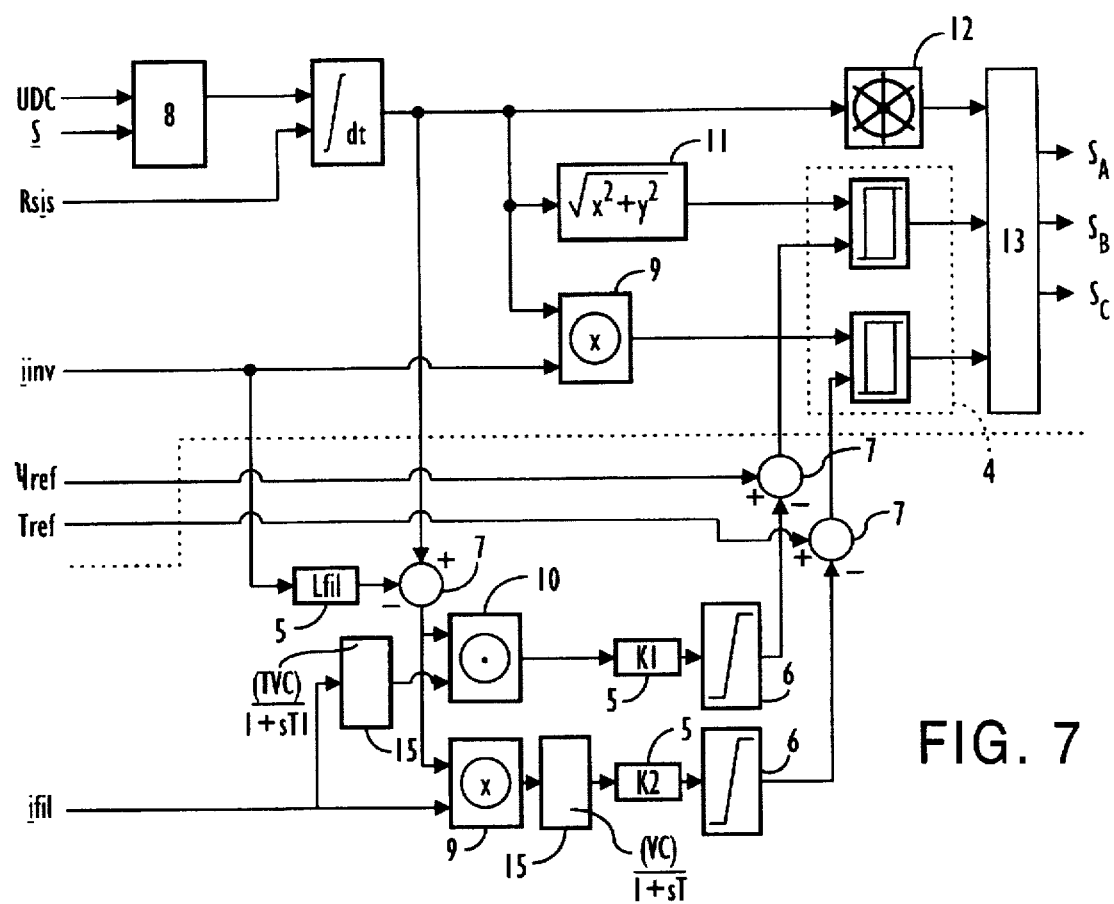
FIG. 7 shows a block diagram of an apparatus according to the invention, based on a fifth exemplary embodiment.

Finally, FIG. 7 shows an exemplary embodiment based on FIG. 2, in which the integration for the component formation is carried out, on the one hand, before the scalar product formation 10 and, on the other hand, after the vector product formation 9. Since the current $i_{fl}$ should be parallel to $\psi_s$ from the start, the remaining part of a vector product represents just the element causing oscillations. The situation with the scalar product is the converse of this, since the voltage multiplied by the $\psi_s$ should result in zero here. For this reason, the voltage is calculated first for the scalar product formation, and not until after this for the vector product formation.

The invention has the advantage that the known DTC method and the known DTC apparatus can also continue to be used essentially for an arrangement having a harmonic filter. The invention makes available an addition which is suitable for use with a harmonic filter and leaves the known part virtually undisturbed. An existing system can therefore be extended in a simple manner without having to dispense with the advantages of a harmonic filter.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by letters patent of the United States is:

1. A method for direct torque control of a three-phase machine (1) which is fed from a multi-phase converter (2) via a harmonic filter ($L_{fil}$, $C_{fil}$) connected in between, which method comprises the following steps:

(a) Calculation of an actual flux value $\psi_{act}$ from a converter output voltage $u_{inv}$ and a correction variable which corresponds essentially to a voltage drop across a copper resistance of the stator of the three-phase machine;

(b) Calculation of an actual torque value $T_{act}$ from a current $i_{inv}$ emitted by the converter and from the actual flux value $\psi_{act}$;

(c) Comparison of the magnitude of the actual flux value $\psi_{act}$ and of the actual torque value $T_{act}$ by means of a hysteresis controller (4) using a reference torque value $T_{ref}$ or a reference flux value $\psi_{ref}$;

(d) Formation of an optimum control vector S ($S_A$, $S_B$, $S_C$) for the converter governed by the hysteresis controller (4) and the magnitude of the actual flux value $\psi_{act}$;

wherein (e) a current $i_{fil}$ flowing through the filter and/or a filter output voltage $u_{fil}$ are/is measured and (f) the reference flux value $\psi_{ref}$ and the reference torque value $T_{ref}$ before they are supplied to the hysteresis controller (4) are corrected on the basis of the current $i_{fil}$ flowing through the filter and/or on the basis of the filter output voltage $u_{fil}$.

2. The method as claimed in claim 1, wherein the reference flux value $\psi_{ref}$ and the reference torque value $T_{ref}$ are corrected in that:

(a) a stator flux $\psi_s$ is formed from a difference between the actual flux value $\psi_{act}$ and a product of the current $i_{inv}$ emitted by the converter with an inductance $L_{fil}$ of the harmonic filter;

(b) the stator flux $\psi_s$ is used to convert the filter output voltage $u_{fil}$ into a component $u_{fild}$ parallel to the stator flux and into a component $u_{filq}$ at right angles to the stator flux;

(c) the reference flux value $\psi_{ref}$ is reduced by an amount proportional to the component $u_{fild}$, and the reference torque value $T_{ref}$ is reduced in proportion to an oscillating element $\Delta u_{afil}$ of the component $u_{filq}$.

3. The method as claimed in claim 2, wherein the oscillating element $\Delta u_{filq}$ of the component $u_{filq}$ is produced from a difference between the component $u_{filq}$ and the product $\overline{\omega}\cdot\psi_s$ of the stator flux $\psi_s$ and an angular frequency $\omega$ of the stator flux $\psi_s$.

4. The method as claimed in claim 2, wherein the oscillating element $\Delta u_{filq}$ of the component $u_{filq}$ is produced by high-pass filtering of component $u_{filq}$.

5. The method as claimed in claim 4, wherein the component $u_{fild}$ is also subjected to high-pass filtering.

6. The method as claimed in claim 3, wherein (a) the current $i_{fil}$ flowing through the filter is measured and (b) the filter output voltage $u_{fil}$ is produced by integration of the current $i_{fil}$.

7. The method as claimed in claim 2, wherein the filter output voltage $u_{fil}$ is converted into the component $u_{fild}$ parallel to the stator flux, and the component $u_{filq}$ at right angles to the stator flux $\psi_s$ is converted by formation of the scalar product and vector product of $u_{fil}$ and the stator flux $\psi_s$.

8. An apparatus for direct torque control of a three-phase machine (1) which is fed from a multi-phase converter (2) via a harmonic filter ($L_{fil}$, $C_{fil}$) connected in between, comprising:

(a) a torque controller (2), which calculates an actual flux value $\psi_{act}$ from a converter output voltage $u_{inv}$ and a correction variable which corresponds essentially to a voltage drop across a copper resistance of the stator of the three-phase machine;

calculates an actual torque value $T_{act}$ from a current $i_{inv}$ emitted by the converter (2) and by the actual flux value $\psi_{act}$;

compares the magnitude of the actual flux value $\psi_{act}$ and the actual torque value $T_{act}$ by means of a hysteresis controller (4) with an externally predetermined reference torque value $T_{ref}$ and, respectively, a reference flux value $\psi_{ref}$; and forms an optimum control vector S ($S_A$, $S_B$, $S_C$) for the converter (2) governed by the hysteresis controller (4) and the actual flux value $\psi_{act}$;

wherein (b) current and voltage instruments are provided which measure a current $i_{fil}$ flowing through the filter and/or a filter output voltage $u_{fil}$, and (c) means are provided which correct the reference flux value $\psi_{ref}$ and the reference torque value $T_{ref}$ before they are supplied to the hysteresis controller on the basis of the current $i_{fil}$ flowing through the filter and/or the filter output voltage $u_{fil}$.

9. The apparatus as claimed in claim 8, wherein the second means comprise:

(a) a first multiplier (5) for forming a product of the current $i_{inv}$ emitted by the converter with an inductance $L_{fil}$ of the harmonic filter;

(b) a first subtractor (7) which calculates a stator flux $\psi_s$ from a difference between the actual flux value $\psi_{act}$ and the product of the current $i_{inv}$ emitted by the converter with the inductance $L_{fil}$ of the harmonic filter;

(c) a coordinate transformer (9, 10), which uses the stator flux $\psi_s$ to convert the filter output voltage $u_{fil}$ into a component $u_{fild}$ parallel to the stator flux and a component $u_{filq}$ at right angles to the stator flux; and (d) a reference value controller which reduces the reference flux value $\psi_{ref}$ by an amount proportional to the component $u_{fild}$ and reduces the reference torque value $T_{ref}$ in proportion to an oscillating element $\Delta u_{afil}$ of the component $u_{filq}$.

10. The apparatus as claimed in claim 9, wherein, both for the component $u_{fid}$ and for the component ufilq, the reference value controller comprises in each case one multiplier (5) which multiplies the components by a first constant K1 or, respectively, by a second constant K2, in each case one limiter (6) connected downstream of the multipliers, and in each case one subtractor (7) connected downstream of the limiters (6), the subtractor assigned to the component $u_{fid}$ acting on the reference flux value $\psi_{ref}$, and the subtractor assigned to the component $u_{filq}$ acting on the reference torque value $T_{ref}$.

* * * * *